(12) United States Patent
Czyryba et al.

(10) Patent No.: US 10,529,331 B2
(45) Date of Patent: Jan. 7, 2020

(54) SUPPRESSING KEY PHRASE DETECTION IN GENERATED AUDIO USING SELF-TRIGGER DETECTOR

(71) Applicant: INTEL CORPORATION, Santa Clara, CA (US)

(72) Inventors: Sebastian Czyryba, Mragowo (PL); Lukasz Kurylo, Gdansk (PL); Tomasz Noczynski, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/838,489

(22) Filed: Dec. 12, 2017

(65) Prior Publication Data

US 2019/0043494 A1 Feb. 7, 2019

(51) Int. Cl.
*G10L 15/22* (2006.01)
*G10L 21/0232* (2013.01)
*G10L 15/20* (2006.01)
*G10L 15/08* (2006.01)
*G10L 21/0208* (2013.01)
*G10L 21/0216* (2013.01)

(52) U.S. Cl.
CPC ............ *G10L 15/22* (2013.01); *G10L 15/08* (2013.01); *G10L 15/20* (2013.01); *G10L 21/0232* (2013.01); *G10L 21/0208* (2013.01); *G10L 2015/088* (2013.01); *G10L 2015/223* (2013.01); *G10L 2021/02082* (2013.01); *G10L 2021/02166* (2013.01)

(58) Field of Classification Search
CPC ......... G10L 15/22; G10L 15/08; G10L 15/20; G10L 21/0232; G10L 21/0208; G10L 2015/088; G10L 2021/02166; G10L 2021/02082
USPC .................................................. 704/233, 275
See application file for complete search history.

(56) References Cited

U.S. PATENT DOCUMENTS 10,250,996 B1 * 4/2019 Holzmann ............ H04R 19/016
2011/0145000 A1 * 6/2011 Hoepken ................. G10L 15/22
704/275
2015/0006176 A1 * 1/2015 Pogue ..................... G10L 15/22
704/249

* cited by examiner

*Primary Examiner* — Yogeshkumar Patel
(74) *Attorney, Agent, or Firm* — International IP Law Group, PLLC (57) ABSTRACT

An example apparatus for suppression of key phrase detection includes an audio receiver to receive generated audio from a loopback endpoint and captured audio from a microphone. The apparatus includes a self-trigger detector to detect a key phrase in the generated audio. The apparatus also includes a detection suppressor to suppress detection of the detected key phrase in the captured audio at a second key detector for a predetermined time in response to detecting the key phrase in the generated audio.

25 Claims, 5 Drawing Sheets

SUPPRESSING KEY PHRASE DETECTION IN GENERATED AUDIO USING SELF-TRIGGER DETECTOR

BACKGROUND

Voice controlled systems may use voice triggers that may enable the systems to perform tasks in response to key phrases. For example, users of such devices may utter a specific key phrase to initiate interaction with the device.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, voice control enabled systems may use voice triggers that may enable the systems to perform tasks in response to key phrases. For example, the key phrase may be one or more words that can be used to wake-up a device. The device may then receive one or more commands associated with some tasks or information. However, in some cases, when such a device plays music or responds to user queries audio content can contain a signal similar to the key phrase. This similar signal can lead to a self-trigger of smart speech devices during music or speech playback. A self-trigger, as used herein, refers to a detection of a key phrase in audio generated by the system. This is unwanted behavior and may result in reduced user satisfaction. As one example, assuming that a key phrase is "my key phrase" and that user can ask the device what is the current key phrase, an example self-trigger may occur as follows. First, a user may initiate interaction by uttering the key phrase "my key phrase." The device may then beep or perform some other indication that it's waiting for a command. As one example, the user may then ask "What is the current key phrase?" The device may then respond with the response: "Current key phrase is 'my key phrase.'" At this point, the device may detect the key phrase it just responded with. This detection of the key phrase in the generated audio is a referred to herein as a self-trigger.

Although audio capture processing in such devices may include an acoustic echo cancellation (AEC) module, such a module may only attenuate echo signals and may not remove the echo signals completely.

The present disclosure relates generally to techniques for suppressing key phrase detection in generated audio. Specifically, the techniques described herein include an apparatus, method and system for suppressing self-triggers using a self-trigger detector. An example apparatus includes an audio receiver to receive generated audio from a loopback endpoint and captured audio from a microphone. The apparatus includes a self-trigger detector to detect a key phrase in the generated audio. The apparatus further includes a detection suppressor to suppress detection of the detected key phrase in the captured audio at a key phrase detector for a predetermined time in response to detecting the key phrase in the generated audio.

The techniques described herein thus enable ignoring key phrases and speech segments spoken and recognized by the device. Checking what the device says by analyzed loopback audio can decrease unwanted detections to a minimum quantity of unwanted detections. Moreover, decreasing unwanted detections helps in improving quality and reliability of the software and device that works with the software. Furthermore, avoiding self-triggers improves the user experience with the device and thereby may increase user satisfaction. In addition, the techniques described herein enable checking device playback in an offline mode without any cloud processing or metadata. For example, the trigger suppression may be performed on-the-fly and within the device itself.

Figure 1:
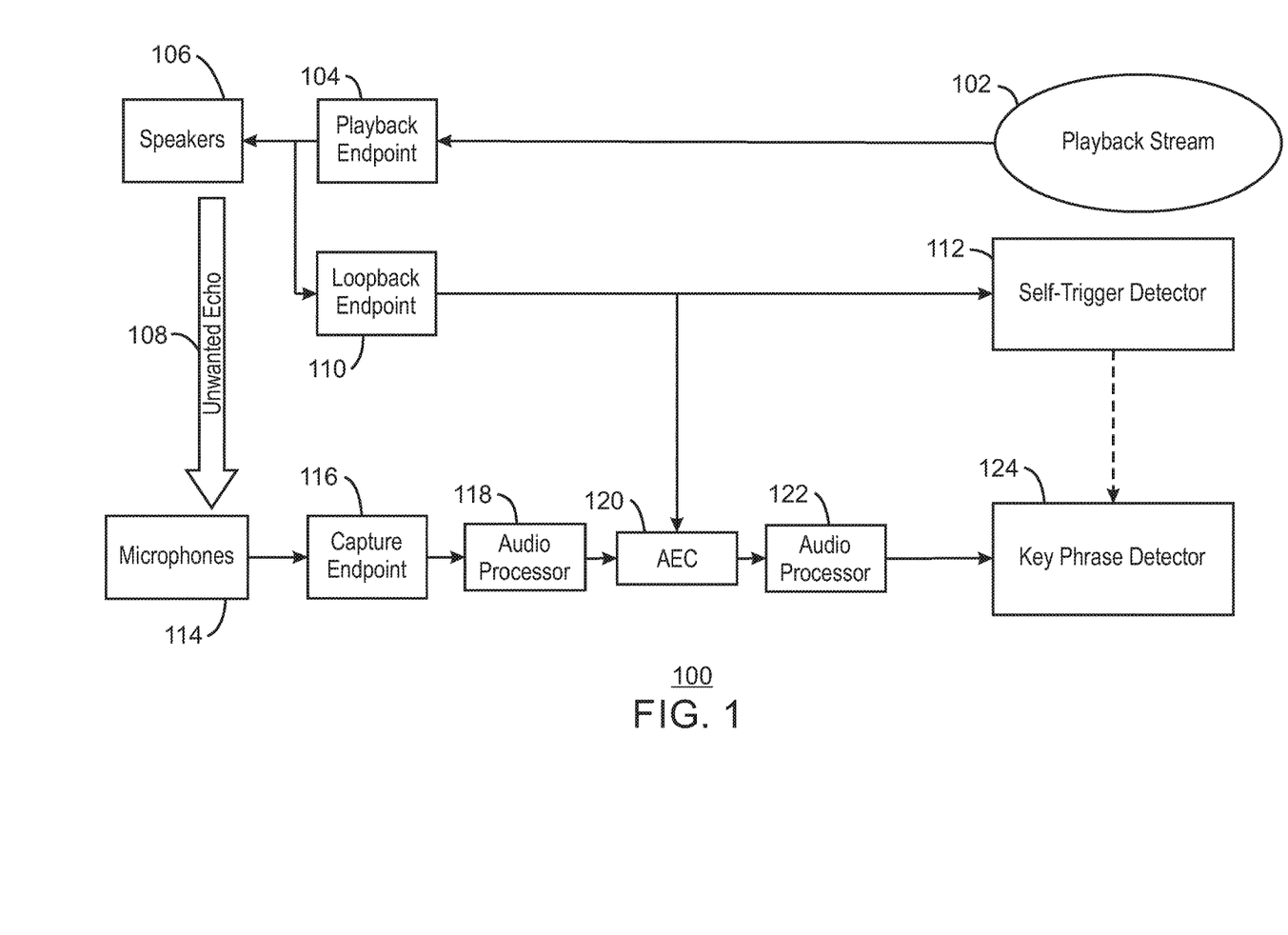
FIG. 1 is a block diagram illustrating an example system for suppressing key phrase detection in generated audio.

FIG. 1 is a block diagram illustrating an example system for suppressing key phrase detection in generated audio. The example system is referred to generally by the reference number 100 and can be implemented in the computing device 400 below in FIG. 4 using the method 300 of FIG. 3 below.

The example system 100 includes a playback stream 102 being sent to a playback endpoint 104. For example, the playback stream 102 may be audio generated by the system 100. The playback endpoint 104 is communicatively coupled to one or more speakers 106. The speakers 106 are shown as generating an unwanted echo 108. The playback endpoint 104 is also communicatively coupled to a loopback endpoint 110. The loopback endpoint 110 is communicatively coupled to a self-trigger detector 112. The system 100 also includes one or more microphones 114 that are communicatively coupled to a captured endpoint 116. The capture endpoint 116 is communicatively coupled to an audio processor 118. The audio processor 118 is communicatively coupled to an acoustic echo cancellation component (AEC) 120. The AEC 120 is also communicatively coupled to the loopback endpoint 110 and an audio processor 122. The audio processor 122 is communicatively coupled to a key phrase detector 124. The key phrase detector 124 is also communicatively coupled to the self-trigger detector 112.

As shown in FIG. 1, during playback music or speech in the playback stream 102, sound reproduced by the loudspeakers 106 and sound wave reflections from objects around the device may be being picked up by the microphones 114 and be sent to capture endpoint 116 as echoes 108. The captured signals can then be processed through processing pipeline including the audio processors 118 and 122 and AEC 120. In some examples, the AEC may attenuate unwanted echoes. However, some unwanted signals may still remain. The processed signals may then be sent to the key-phrase detection system 124.

In some examples, the system may record unwanted echoes without any protection mechanism before recording the unwanted key phrases in residual echoes. For example, even with an audio cancellation, the residual echoes may still cause key phrases to be detected. Therefore, the system 100 can include a self-trigger detector 112 that can be used to prevent self-triggers in the key-phrase detection process. For example, a loopback stream from the loopback endpoint 110 may be sent to both the AEC 120 and the self-trigger detector 112. In some examples, the self-trigger detector 112 may be a second key phrase detector that is used to detect key phrases in the loopback stream. The loopback stream may be a copy of what a device plays on the speakers 106. In some examples, the self-trigger detector 112 can score the loopback stream for one or more key phrases. For example, a key phrase may be detected by either the self-trigger detector 112 or the key phrase detector 124 in response to a score exceeding a threshold score for a given key phrase. In some examples, the threshold may depend on one or more conditions of the system. In some examples, in response to detecting a key-phrase in the loopback stream, detection of the key phrase in the capture stream from the microphone 114 can be suppressed for configured time period at the key phrase detector 124. In some examples, detection of all key phrases may be disabled for the configured time period. In some examples, the time period may be based on the key phrase detected by the self-trigger detector. In some examples, the beginning of the time period may be offset for latencies in the system such as processing of the captured audio, and a time period for audio capture from the microphone. For example, the length of the time period may be set or modified based or on one or more reported latencies from the system. Thus, the system 100 can avoid redundant device awakening due to unwanted key phrases in echoes from the generated audio from the speaker 106 being detected in the captured audio from the microphone 114.

The diagram of FIG. 1 is not intended to indicate that the example system 100 is to include all of the components shown in FIG. 1. Rather, the example system 100 can be implemented using fewer or additional components not illustrated in FIG. 1 (e.g., additional processors, detectors, playback streams, etc.). For example, the self-trigger detector 112 or the key phrase detector 124 may include a feature extractor and a neural network trained based using one or more key phrase models.

Figure 2:
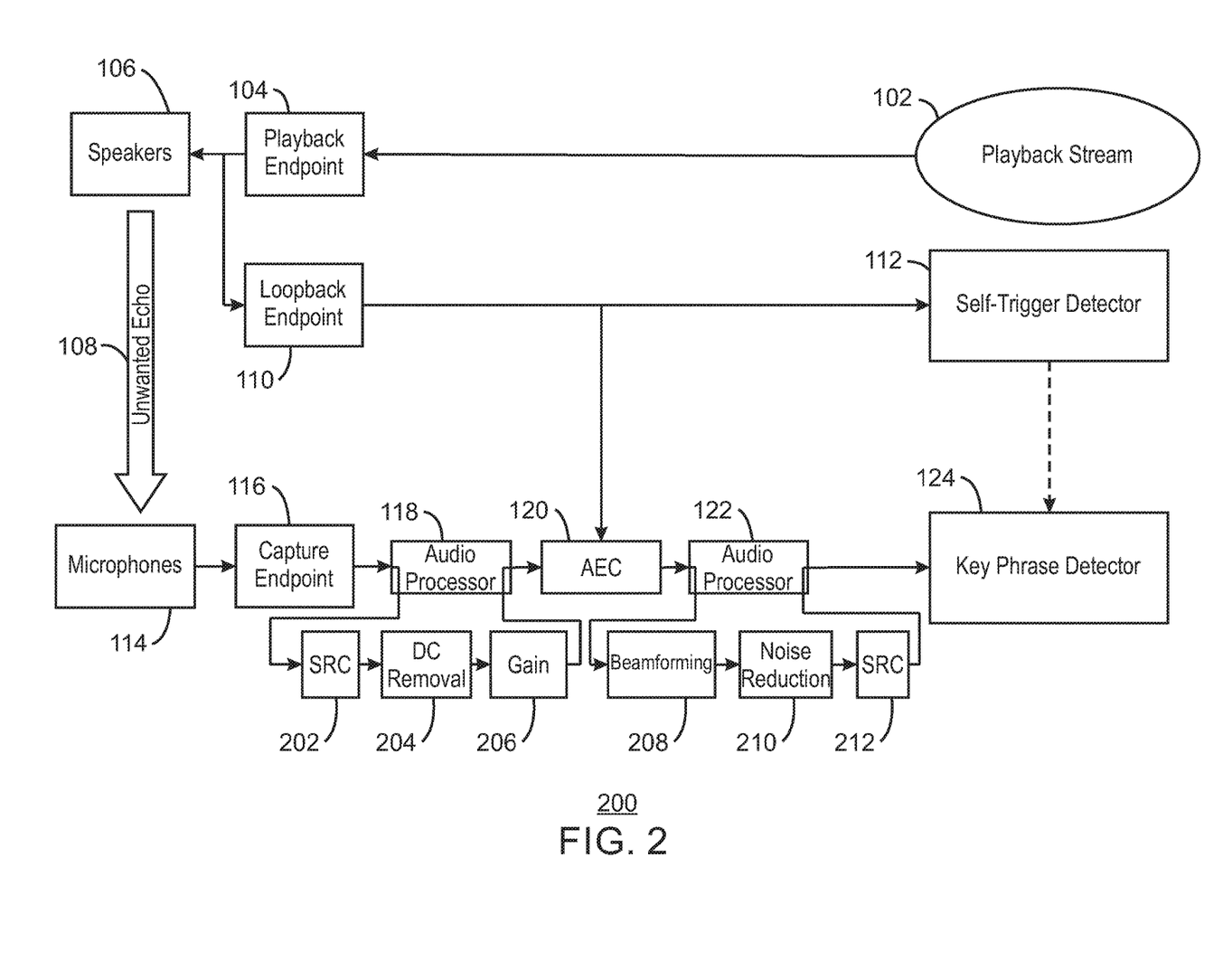
FIG. 2 is a diagram illustrating another example system for suppressing key phrase detection in generated audio with additional processing layers.

FIG. 2 is a block diagram illustrating an example system for suppressing key phrase detection in generated audio with additional processing layers. The example system is referred to generally by the reference number 200 and can be implemented in the computing device 400 below in FIG. 4 using the method 300 of FIG. 3 below.

The example system 200 includes similarly numbered elements from FIG. 1 above. In addition, FIG. 2 shows pre-processing functions 202-212 that can be performed on the captured audio from microphones 114 by audio processors 118 and 122.

As shown in FIG. 2, at block 202, the audio processor 118 can perform sampling rate conversion (SRC). For example, the sampling rate of captured audio from the microphone 114 may be converted into a second sampling rate for the AEC 120.

At block 204, the audio processor 118 can perform direct current (DC) removal. For example, the DC removal may be performed to bring a DC bias offset closer to zero.

At block 206, the audio processor 118 can apply gain to the captured audio. For example, the processor can increase the power of the captured audio from the microphone. In some examples, the pre-processed captured audio can then be sent to the AEC 120 for acoustic echo cancellation.

At block 208, the audio processor 122 can receive the processed audio from the AEC 120 and apply beamforming on the audio. In some examples, captured audio from two or more microphones may be processed for directional signal reception. For example, audio from two or more microphones may be combined in such a way that audio signals at particular angles experience constructive interference while others experience destructive interference.

At block 210, the audio processor 122 can perform noise reduction on the captured audio. For example, the audio processor 122 may perform spectral subtraction on the captured audio.

At block 212, the audio processor 122 can perform another sampling rate conversion (SRC). For example, the sampling rate of captured audio from the AEC 120 may be converted into a second sampling rate to align the sampling rate with a sampling rate supported by the key phrase detector 124. For example, the sampling rate supported by the key phrase detector 124 may be 16 kilohertz (kHz) with 16 bit depth.

The diagram of FIG. 2 is not intended to indicate that the example system 200 is to include all of the components shown in FIG. 2. Rather, the example system 200 can be implemented using fewer or additional components not illustrated in FIG. 2 (e.g., additional pre-processing, post-processing, processors, detectors, playback streams, etc.).

Figure 3:
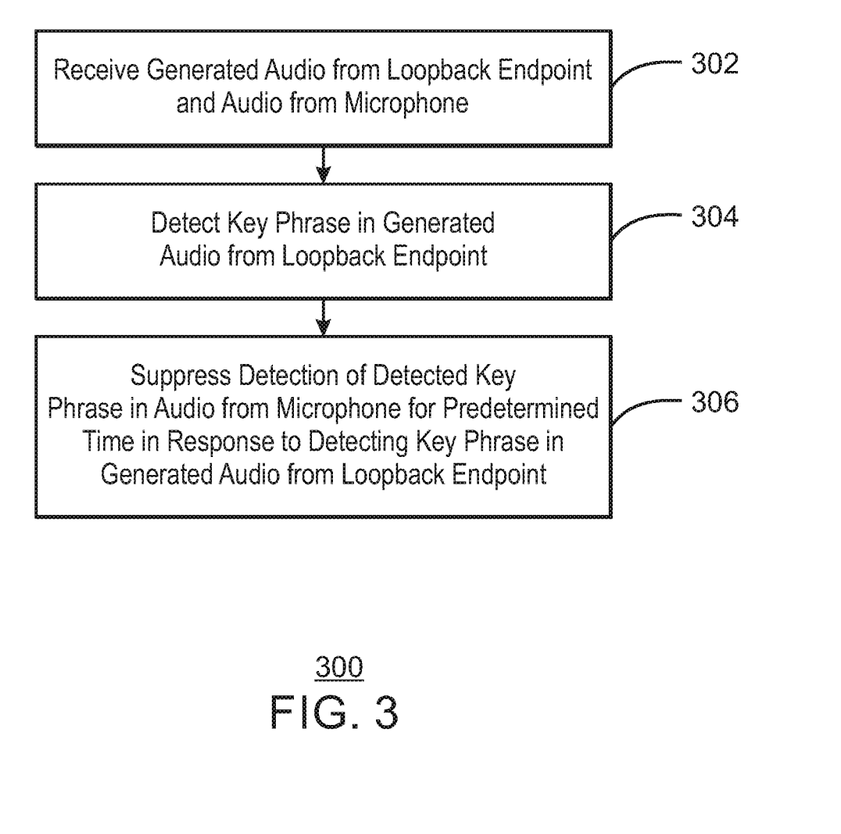
FIG. 3 is a flow chart illustrating a method for suppressing key phrase detection in generated audio.

FIG. 3 is a flow chart illustrating a method for suppressing key phrase detection in generated audio. The example method is generally referred to by the reference number 300 and can be implemented in the systems 100 and 200 of FIGS. 1 and 2 above, the processor 402 and self-trigger suppressor 430 of the computing device 400 of FIG. 4 below, or the computer readable media 500 of FIG. 5 below.

At block 302, a processor receives generated audio from a loopback endpoint and captured audio from a microphone. For example, the generated audio may be audio that is to be played on a speaker. In some examples, the captured audio may include an echo corresponding to the generated audio. In some examples, the loopback endpoint is to receive the generated audio from a playback endpoint. In some examples, the generated audio may be a reference signal.

At block 304, the processor detects a key phrase in the generated audio from the loopback endpoint. For example, the key phrase may be one or more words used to waken a device. In some examples, the key phrase may be a command used to perform one or more actions on the device.

At block 306, the processor suppresses detection of the detected key phrase in the audio from the microphone at a key phrase detector for a predetermined time in response to detecting the key phrase in the generated audio from the loopback endpoint. For example, the predetermined time may be based on the detected key phrase.

This process flow diagram is not intended to indicate that the blocks of the example process 300 are to be executed in any particular order, or that all of the blocks are to be included in every case. Further, any number of additional blocks not shown may be included within the example process 300, depending on the details of the specific implementation. For example, additional processing may be performed on the captured audio or generated audio as described above.

Figure 4:
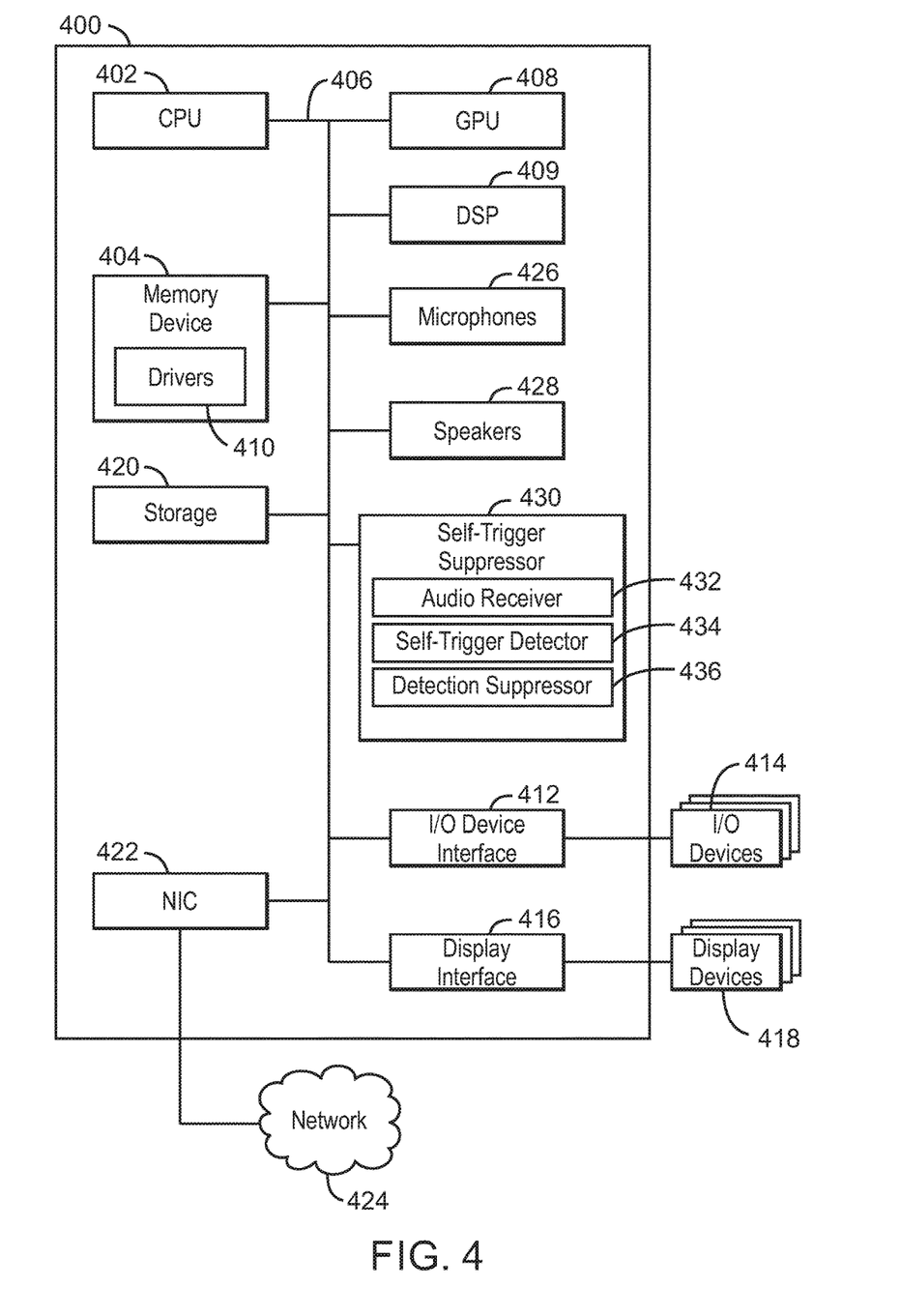
FIG. 4 is block diagram illustrating an example computing device that can suppress key phrase detection in generated audio.

Referring now to FIG. 4, a block diagram is shown illustrating an example computing device that can suppress key phrase detection in generated audio. The computing device 400 may be, for example, a laptop computer, desktop computer, tablet computer, mobile device, or wearable device, among others. In some examples, the computing device 400 may be a smart device, such as a smart speaker, a smart speech device, personal assistant devices, etc. The computing device 400 may include a central processing unit (CPU) 402 that is configured to execute stored instructions, as well as a memory device 404 that stores instructions that are executable by the CPU 402. The CPU 402 may be coupled to the memory device 404 by a bus 406. Additionally, the CPU 402 can be a single core processor, a multi-core processor, a computing cluster, or any number of other configurations. Furthermore, the computing device 400 may include more than one CPU 402. In some examples, the CPU 402 may be a system-on-chip (SoC) with a multi-core processor architecture. The memory device 404 can include random access memory (RAM), read only memory (ROM), flash memory, or any other suitable memory systems. For example, the memory device 404 may include dynamic random access memory (DRAM).

The memory device 404 can include random access memory (RAM), read only memory (ROM), flash memory, or any other suitable memory systems. For example, the memory device 404 may include dynamic random access memory (DRAM).

The computing device 400 may also include a graphics processing unit (GPU) 408. As shown, the CPU 402 may be coupled through the bus 406 to the GPU 408. The GPU 408 may be configured to perform any number of graphics operations within the computing device 400. For example, the GPU 408 may be configured to render or manipulate graphics images, graphics frames, videos, or the like, to be displayed to a user of the computing device 400.

The computing device 400 may also include a digital signal processor (DSP) 409. As shown, the CPU 402 may be coupled through the bus 406 to the DSP 409. The DSP 409 may be configured to perform any number of audio processing operations within the computing device 400. For example, the DSP 409 may be configured to work with a key phrase detector in a lower power mode to detect key phrases.

The memory device 404 can include random access memory (RAM), read only memory (ROM), flash memory, or any other suitable memory systems. For example, the memory device 404 may include dynamic random access memory (DRAM). The memory device 404 may include device drivers 410 that are configured to execute the instructions for suppressing key phrase detection in generated audio. The device drivers 410 may be software, an application program, application code, or the like.

The CPU 402 may also be connected through the bus 406 to an input/output (I/O) device interface 412 configured to connect the computing device 400 to one or more I/O devices 414. The I/O devices 414 may include, for example, a keyboard and a pointing device, wherein the pointing device may include a touchpad or a touchscreen, among others. The I/O devices 414 may be built-in components of the computing device 400, or may be devices that are externally connected to the computing device 400. In some examples, the memory 404 may be communicatively coupled to I/O devices 414 through direct memory access (DMA).

The CPU 402 may also be linked through the bus 406 to a display interface 416 configured to connect the computing device 400 to a display device 418. The display device 418 may include a display screen that is a built-in component of the computing device 400. The display device 418 may also include a computer monitor, television, or projector, among others, that is internal to or externally connected to the computing device 400.

The computing device 400 also includes a storage device 420. The storage device 420 is a physical memory such as a hard drive, an optical drive, a thumbdrive, an array of drives, a solid-state drive, or any combinations thereof. The storage device 420 may also include remote storage drives.

The computing device 400 may also include a network interface controller (NIC) 422. The NIC 422 may be configured to connect the computing device 400 through the bus 406 to a network 424. The network 424 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 400 further includes microphones 426. For example, the microphones 426 may include transducers that convert sound into electrical signals. In some example, the microphones 426 may be condenser microphones, dynamic microphones, ribbon microphones, carbon microphones, piezoelectric microphones, fiber optic microphones, laser microphones, MicroElectrical-Mechanical System (MEMS) microphones, etc.

The computing device 400 also further includes speakers 428. For example, the speakers 428 may include electroacoustic transducers that convert electrical audio signals into corresponding sounds. In some examples, the speakers may be internal speakers or external speakers. In some examples, the speakers 428 may generate sounds including or similar to one or more key phrases.

The computing device 400 further includes a self-trigger suppressor 430. For example, the self-trigger suppressor 430 can be used to suppress self-triggering caused by detection of key phrases in generated audio. The self-trigger suppressor 430 can include an audio receiver 432, a self-trigger detector 434, and a detection suppressor 436. In some examples, each of the components 432-436 of the self-trigger suppressor 430 may be a microcontroller, embedded processor, or software module. The audio receiver 432 can receive generated audio from a loopback endpoint and captured audio from a microphone. In some examples, the generated audio includes a reference signal. For example, the loopback endpoint can receive the generated audio from a playback endpoint. In some examples, the captured audio includes an echo corresponding to the generated audio. The self-trigger detector 434 can detect a key phrase in the generated audio. The detection suppressor 436 can suppress detection of the detected key phrase in the captured audio at a key phrase detector for a predetermined time in response to detecting the key phrase in the generated audio. For example, the predetermined time can be based on the detected key phrase.

The block diagram of FIG. 4 is not intended to indicate that the computing device 400 is to include all of the components shown in FIG. 4. Rather, the computing device 400 can include fewer or additional components not illustrated in FIG. 4, such as additional buffers, additional processors, and the like. The computing device 400 may include any number of additional components not shown in FIG. 4, depending on the details of the specific implementation. For example, the computing device 400 can include a processor to the processor is to perform sampling rate conversion on the captured audio. In some examples, the processor may be the CPU 402 or a specialized audio processor such as the DSP 409. In some examples, the processor can also perform direct current (DC) removal on the captured audio to remove DC bias. In some examples, the processor can increase gain on the captured audio. In some examples, the processor can perform beamforming on the captured audio. In some examples, the processor can perform noise reduction on the captured audio.

Furthermore, any of the functionalities of the audio receiver 432, the self-trigger detector 434, or the detection suppressor 436, may be partially, or entirely, implemented in hardware and/or in the processor 402. For example, the functionality may be implemented with an application specific integrated circuit, in logic implemented in the processor 402, or in any other device. In addition, any of the functionalities of the CPU 402 may be partially, or entirely, implemented in hardware and/or in a processor. For example, the functionality of the self-trigger suppressor 430 may be implemented with an application specific integrated circuit, in logic implemented in a processor, in logic implemented in a specialized graphics processing unit such as the GPU 408, or in any other device.

Figure 5:
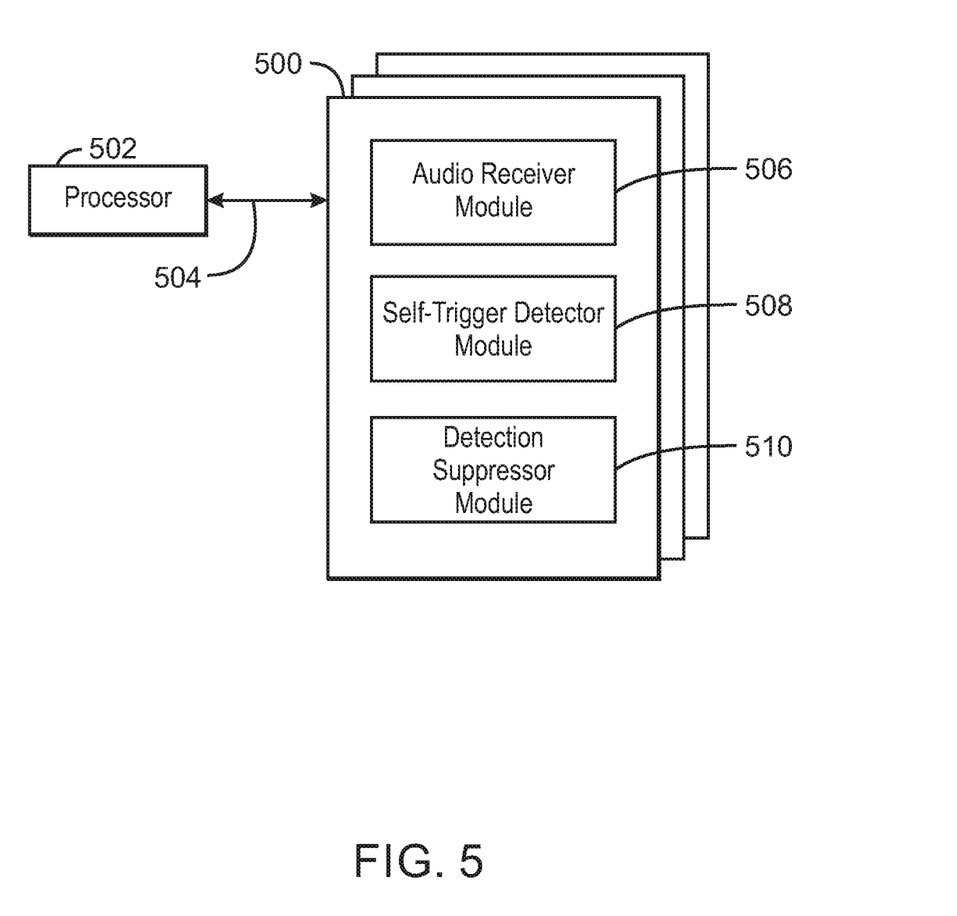
FIG. 5 is a block diagram showing computer readable media that store code for suppressing key phrase detection in generated audio.

FIG. 5 is a block diagram showing computer readable media 500 that store code for suppressing key phrase detection in generated audio. The computer readable media 500 may be accessed by a processor 502 over a computer bus 504. Furthermore, the computer readable medium 500 may include code configured to direct the processor 502 to perform the methods described herein. In some embodiments, the computer readable media 500 are non-transitory computer readable media. In some examples, the computer readable media 500 may be storage media.

The various software components discussed herein may be stored on one or more computer readable media 500, as indicated in FIG. 5. For example, an audio receiver module 506 may be configured to receive generated audio from a loopback endpoint and audio from a microphone. For example, the generated audio may be a reference signal. In some examples, the loopback endpoint can receive the generated audio from a playback endpoint. In some examples, the captured audio can include an echo corresponding to the generated audio. For example, the echo may be generated via a speaker transducing the generated audio from an electrical signal into an audio wave. A self-trigger detector module 508 may be configured to detect a key phrase in the generated audio from the loopback endpoint. A detection suppressor module 510 may be configured to suppress detection of the detected key phrase in the audio from the microphone at a key phrase detector for a predetermined time in response to detecting the key phrase in the generated audio from the loopback endpoint. For example, the predetermined time may be based on the detected key phrase.

The block diagram of FIG. 5 is not intended to indicate that the computer readable media 500 is to include all of the components shown in FIG. 5. Further, the computer readable media 500 may include any number of additional components not shown in FIG. 5, depending on the details of the specific implementation. For example, the computer readable media 500 may include an audio processor module to perform sampling rate conversion on the captured audio. In some examples, the computer readable media 500 may include an audio echo cancellation module to perform echo cancellation on the captured audio. In some examples, audio processor module can also perform direct current (DC) removal on the captured audio to remove DC bias. In some examples, the audio processor module can increase gain on the captured audio. In some examples, the audio processor module can perform beamforming on the captured audio. In some examples, the audio processor module can perform noise reduction on the captured audio.

EXAMPLES

Example 1 is an apparatus for suppression of key phrase detection. The apparatus includes an audio receiver to receive generated audio from a loopback endpoint and captured audio from a microphone. The apparatus also includes a self-trigger detector to detect a key phrase in the generated audio. The apparatus further includes a detection suppressor to suppress detection of the detected key phrase in the captured audio at a key phrase detector for a predetermined time in response to detecting the key phrase in the generated audio.

Example 2 includes the apparatus of example 1, including or excluding optional features. In this example, the generated audio comprises a reference signal.

Example 3 includes the apparatus of any one of examples 1 to 2, including or excluding optional features. In this example, the loopback endpoint is to receive the generated audio from a playback endpoint.

Example 4 includes the apparatus of any one of examples 1 to 3, including or excluding optional features. In this example, the captured audio comprises an echo corresponding to the generated audio.

Example 5 includes the apparatus of any one of examples 1 to 4, including or excluding optional features. In this example, the predetermined time is based on the detected key phrase.

Example 6 includes the apparatus of any one of examples 1 to 5, including or excluding optional features. In this example, the apparatus includes a processor to perform echo cancellation on the captured audio.

Example 7 includes the apparatus of any one of examples 1 to 6, including or excluding optional features. In this example, the apparatus includes a processor to perform direct current (DC) removal on the captured audio to remove DC bias.

Example 8 includes the apparatus of any one of examples 1 to 7, including or excluding optional features. In this example, the apparatus includes a processor to increase gain on the captured audio.

Example 9 includes the apparatus of any one of examples 1 to 8, including or excluding optional features. In this example, the apparatus includes a processor to perform beamforming on the captured audio.

Example 10 includes the apparatus of any one of examples 1 to 9, including or excluding optional features. In this example, the apparatus includes a processor to perform noise reduction on the captured audio.

Example 11 is a method for suppressing key phrase detection. The method includes receiving, via a processor, generated audio from a loopback endpoint and captured audio from a microphone. The method also includes detecting, via the processor, a key phrase in the generated audio from the loopback endpoint. The method further includes suppressing, via the processor, detection of the detected key phrase in the captured audio for a predetermined time in response to detecting the key phrase in the generated audio.

Example 12 includes the method of example 11, including or excluding optional features. In this example, the generated audio comprises a reference signal.

Example 13 includes the method of any one of examples 11 to 12, including or excluding optional features. In this example, the loopback endpoint is to receive the generated audio from a playback endpoint.

Example 14 includes the method of any one of examples 11 to 13, including or excluding optional features. In this example, the captured audio comprises an echo corresponding to the generated audio.

Example 15 includes the method of any one of examples 11 to 14, including or excluding optional features. In this example, the predetermined time is based on the detected key phrase.

Example 16 includes the method of any one of examples 11 to 15, including or excluding optional features. In this example, the method includes performing echo cancellation on the captured audio.

Example 17 includes the method of any one of examples 11 to 16, including or excluding optional features. In this example, the method includes performing direct current (DC) removal on the captured audio to remove DC bias.

Example 18 includes the method of any one of examples 11 to 17, including or excluding optional features. In this example, the method includes increasing gain on the captured audio.

Example 19 includes the method of any one of examples 11 to 18, including or excluding optional features. In this example, the method includes beamforming the captured audio.

Example 20 includes the method of any one of examples 11 to 19, including or excluding optional features. In this example, the method includes performing noise reduction on the captured audio.

Example 21 is at least one computer readable medium for suppressing detection of key phrases having instructions stored therein that. The computer-readable medium includes instructions that direct the processor to receive generated audio from a loopback endpoint and audio from a microphone. The computer-readable medium also includes instructions that direct the processor to detect a key phrase in the generated audio from the loopback endpoint. The computer-readable medium further includes instructions that direct the processor to suppress detection of the detected key phrase in the audio from the microphone at a key phrase detector for a predetermined time in response to detecting the key phrase in the generated audio from the loopback endpoint.

Example 22 includes the computer-readable medium of example 21, including or excluding optional features. In this example, the generated audio comprises a reference signal.

Example 23 includes the computer-readable medium of any one of examples 21 to 22, including or excluding optional features. In this example, the loopback endpoint is to receive the generated audio from a playback endpoint.

Example 24 includes the computer-readable medium of any one of examples 21 to 23, including or excluding optional features. In this example, the captured audio comprises an echo corresponding to the generated audio.

Example 25 includes the computer-readable medium of any one of examples 21 to 24, including or excluding optional features. In this example, the predetermined time is based on the detected key phrase.

Example 26 includes the computer-readable medium of any one of examples 21 to 25, including or excluding optional features. In this example, the computer-readable medium includes instructions to perform echo cancellation on the captured audio.

Example 27 includes the computer-readable medium of any one of examples 21 to 26, including or excluding optional features. In this example, the computer-readable medium includes instructions to perform direct current (DC) removal on the captured audio to remove DC bias.

Example 28 includes the computer-readable medium of any one of examples 21 to 27, including or excluding optional features. In this example, the computer-readable medium includes instructions to increase gain on the captured audio.

Example 29 includes the computer-readable medium of any one of examples 21 to 28, including or excluding optional features. In this example, the computer-readable medium includes instructions to beamform the captured audio.

Example 30 includes the computer-readable medium of any one of examples 21 to 29, including or excluding optional features. In this example, the computer-readable medium includes instructions to perform noise reduction on the captured audio.

Example 31 is a system for suppression of key phrase detection. The system includes an audio receiver to receive generated audio from a loopback endpoint and captured audio from a microphone. The system also includes a self-trigger detector to detect a key phrase in the generated audio. The system further includes a detection suppressor to suppress detection of the detected key phrase in the captured audio at a key phrase detector for a predetermined time in response to detecting the key phrase in the generated audio.

Example 32 includes the system of example 31, including or excluding optional features. In this example, the generated audio comprises a reference signal.

Example 33 includes the system of any one of examples 31 to 32, including or excluding optional features. In this example, the loopback endpoint is to receive the generated audio from a playback endpoint.

Example 34 includes the system of any one of examples 31 to 33, including or excluding optional features. In this example, the captured audio comprises an echo corresponding to the generated audio.

Example 35 includes the system of any one of examples 31 to 34, including or excluding optional features. In this example, the predetermined time is based on the detected key phrase.

Example 36 includes the system of any one of examples 31 to 35, including or excluding optional features. In this example, the system includes a processor to perform echo cancellation on the captured audio.

Example 37 includes the system of any one of examples 31 to 36, including or excluding optional features. In this example, the system includes a processor to perform direct current (DC) removal on the captured audio to remove DC bias.

Example 38 includes the system of any one of examples 31 to 37, including or excluding optional features. In this example, the system includes a processor to increase gain on the captured audio.

Example 39 includes the system of any one of examples 31 to 38, including or excluding optional features. In this example, the system includes a processor to perform beamforming on the captured audio.

Example 40 includes the system of any one of examples 31 to 39, including or excluding optional features. In this example, the system includes a processor to perform noise reduction on the captured audio.

Example 41 is a system for suppression of key phrase detection. The system includes means for receiving generated audio from a loopback endpoint and captured audio from a microphone. The system also includes means for detecting a key phrase in the generated audio. The system further includes means for suppressing detection of the detected key phrase in the captured audio at a key phrase detector for a predetermined time in response to detecting the key phrase in the generated audio.

Example 42 includes the system of example 41, including or excluding optional features. In this example, the generated audio comprises a reference signal.

Example 43 includes the system of any one of examples 41 to 42, including or excluding optional features. In this example, the loopback endpoint is to receive the generated audio from a playback endpoint.

Example 44 includes the system of any one of examples 41 to 43, including or excluding optional features. In this example, the captured audio comprises an echo corresponding to the generated audio.

Example 45 includes the system of any one of examples 41 to 44, including or excluding optional features. In this example, the predetermined time is based on the detected key phrase.

Example 46 includes the system of any one of examples 41 to 45, including or excluding optional features. In this example, the system includes means for performing echo cancellation on the captured audio.

Example 47 includes the system of any one of examples 41 to 46, including or excluding optional features. In this example, the system includes means for performing direct current (DC) removal on the captured audio to remove DC bias.

Example 48 includes the system of any one of examples 41 to 47, including or excluding optional features. In this example, the system includes means for increasing gain on the captured audio.

Example 49 includes the system of any one of examples 41 to 48, including or excluding optional features. In this example, the system includes means for performing beamforming on the captured audio.

Example 50 includes the system of any one of examples 41 to 49, including or excluding optional features. In this example, the system includes means for performing noise reduction on the captured audio.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for suppression of key phrase detection, comprising:
    an audio receiver to receive generated audio from a loopback endpoint and captured audio from a microphone;
    a self-trigger detector to detect a key phrase in the generated audio from the loopback endpoint; and
    a detection suppressor to suppress detection of the detected key phrase in the captured audio from the microphone at a key phrase detector for a predetermined time in response to detecting the key phrase in the generated audio from the loopback endpoint.

2. The apparatus of claim 1, wherein the generated audio comprises a reference signal.

3. The apparatus of claim 1, wherein the loopback endpoint is to receive the generated audio from a playback endpoint.

4. The apparatus of claim 1, wherein the captured audio comprises an echo corresponding to the generated audio.

5. The apparatus of claim 1, wherein the predetermined time is based on the detected key phrase.

6. The apparatus of claim 1, comprising a processor to perform echo cancellation on the captured audio.

7. The apparatus of claim 1, comprising a processor to perform direct current (DC) removal on the captured audio to remove DC bias.

8. The apparatus of claim 1, comprising a processor to increase gain on the captured audio.

9. The apparatus of claim 1, comprising a processor to perform beamforming on the captured audio.

10. The apparatus of claim 1, comprising a processor to perform noise reduction on the captured audio.

11. A method for suppressing key phrase detection, comprising:
    receiving, via a processor, generated audio from a loopback endpoint and captured audio from a microphone;
    detecting, via the processor, a key phrase in the generated audio from the loopback endpoint; and
    suppressing, via the processor, detection of the detected key phrase in the captured audio from the microphone for a predetermined time in response to detecting the key phrase in the generated audio from the loopback endpoint.

12. The method of claim 11, wherein the generated audio comprises a reference signal.

13. The method of claim 11, wherein the loopback endpoint is to receive the generated audio from a playback endpoint.

14. The method of claim 11, wherein the captured audio comprises an echo corresponding to the generated audio.

15. The method of claim 11, wherein the predetermined time is based on the detected key phrase.

16. The method of claim 11, comprising performing echo cancellation on the captured audio.

17. The method of claim 11, comprising performing direct current (DC) removal on the captured audio to remove DC bias.

18. The method of claim 11, comprising increasing gain on the captured audio.

19. The method of claim 11, comprising beamforming the captured audio.

20. The method of claim 11, comprising performing noise reduction on the captured audio.

21. At least one non-transitory computer readable medium for suppressing detection of key phrases having instructions stored therein that, in response to being executed on a computing device, cause the computing device to:

receive generated audio from a loopback endpoint and audio from a microphone;

detect a key phrase in the generated audio from the loopback endpoint; and suppress detection of the detected key phrase in the audio from the microphone at a key phrase detector for a predetermined time in response to detecting the key phrase in the generated audio from the loopback endpoint.

22. The at least one non-transitory computer readable medium of claim 21, wherein the generated audio comprises a reference signal.

23. The at least one non-transitory computer readable medium of claim 21, wherein the loopback endpoint is to receive the generated audio from a playback endpoint.

24. The at least one non-transitory computer readable medium of claim 21, wherein the captured audio comprises an echo corresponding to the generated audio.

25. The at least one non-transitory computer readable medium of claim 21, wherein the predetermined time is based on the detected key phrase.

* * * * *